US011237800B2

(12) United States Patent
Aldebert et al.

(10) Patent No.: US 11,237,800 B2
(45) Date of Patent: Feb. 1, 2022

(54) TIME-SHIFTED SEED FOR RANDOM NUMBER GENERATOR

(71) Applicant: International Business Machines Corporation, Armonk, NY (US)

(72) Inventors: Jean-Paul Aldebert, Biot (FR); Jean-Luc Frenoy, Cagnes sur Mer (FR)

(73) Assignee: International Business Machines Corporation, Armonk, NY (US)

( * ) Notice: Subject to any disclaimer, the term of this patent is extended or adjusted under 35 U.S.C. 154(b) by 50 days.

(21) Appl. No.: 16/680,566

(22) Filed: Nov. 12, 2019

(65) Prior Publication Data

US 2021/0141607 A1 May 13, 2021

(51) Int. Cl.
*G06F 7/58* (2006.01)

(52) U.S. Cl.
CPC .................................. *G06F 7/582* (2013.01)

(58) Field of Classification Search
CPC .................................. G06F 7/58–586
See application file for complete search history.

(56) References Cited

U.S. PATENT DOCUMENTS

| 5,383,143 | A | * | 1/1995 | Crouch | ............ | G01R 31/31813 |
| | | | | | | 708/254 |
| 6,181,164 | B1 | | 1/2001 | Miller | | |
| 8,843,539 | B2 | | 9/2014 | Dey | | |
| 9,304,740 | B2 | | 4/2016 | Barakat et al. | | |
| 9,335,972 | B2 | | 5/2016 | Yang et al. | | |
| 9,418,250 | B2 | * | 8/2016 | Brocker | .................. | G06F 21/87 |
| 9,606,771 | B2 | | 3/2017 | Mei et al. | | |
| 9,785,409 | B1 | | 10/2017 | Matthews, Jr. et al. | | |
| 9,846,568 | B2 | | 12/2017 | Hamilton et al. | | |
| 2003/0059045 | A1 | | 3/2003 | Ruehle | | |
| 2014/0362986 | A1 | | 12/2014 | Sobel | | |
| 2017/0115959 | A1 | | 4/2017 | Hamilton et al. | | |
| 2017/0344343 | A1 | | 11/2017 | Best | | |

FOREIGN PATENT DOCUMENTS

WO     2015056236 A1     4/2015

OTHER PUBLICATIONS

A. A. Al-Yamani and E. J. McCluskey, "Built-in reseeding for serial BIST," in Proc. IEEE VLSI Test Symp., pp. 63-68, 2003 (Year: 2003).*

(Continued)

*Primary Examiner* — Matthew D Sandifer
(74) *Attorney, Agent, or Firm* — Peter J. Edwards (57) ABSTRACT

A pseudorandom number is obtained from a pseudorandom number generator. A first register input is created using the pseudorandom number. The first register input is inserted into a shift register which also comprises a second register input. A first digit of the first register input and a second digit of the second register input are selected from the shift register. A seed is created using the first digit and the second digit. The seed is input into the pseudorandom number generator. A newly generated pseudorandom number is obtained from the pseudorandom number generator.

17 Claims, 7 Drawing Sheets

(56) References Cited

OTHER PUBLICATIONS

E. Kalligeros, X. Kavousianos, D. Bakalis and D. Nikolos, "New reseeding technique for LFSR-based test pattern generation," Proceedings Seventh International On-Line Testing Workshop, pp. 80-86, 2001 (Year: 2001).*

Buchovecka, "Analysis of a True Random Number Generator," Czech Technical University in Prague, Master's Thesis, Dec. 14, 2012, 87 pages.

Santoro et al., "On-the-Fly Evaluation of FPGA-Based True Random Number Generator," IEEE Computer Society Annual Symposium on VLSI, May 23-15, 2009, 7 pages.

Vishnuraj et al., "Random Number Generation By Using Reseeding Mixing Psuedo Random Number Generator," International Journal of Power Control and Computation (IJPCSC), vol. 6. No.1, Jan.-Mar. 2014, 7 pages.

Kumar et al., "Random Number Generator Using Various Techniques through VHDL," International Journal of Computer Applications in Engineering Sciences, vol. 1, Issue II, Jun. 2011, 3 pages.

* cited by examiner

|     | 322 | 324 | 326 | 328 | 330 | 332 | 334 | 336 |
|-----|-----|-----|-----|-----|-----|-----|-----|-----|
| 302 | 0 | 1 | 0 | 0 | 0 | 1 | 1 | 1 |
| 304 | 0 | 1 | 1 | 0 | 1 | 1 | 1 | 1 |
| 306 | 0 | 1 | 0 | 0 | 1 | 1 | 1 | 1 |
| 308 | 0 | 1 | 1 | 0 | 0 | 1 | 0 | 0 |
| 310 | 0 | 1 | 1 | 0 | 0 | 1 | 1 | 0 |
| 312 | 0 | 1 | 1 | 0 | 1 | 0 | 0 | 1 |
| 314 | 0 | 1 | 1 | 0 | 1 | 1 | 1 | 0 |
| 316 | 0 | 1 | 0 | 0 | 0 | 1 | 0 | 0 |

FIG. 3B

|     | 322 | 324 | 326 | 328 | 330 | 332 | 334 | 336 |
|-----|-----|-----|-----|-----|-----|-----|-----|-----|
| 302 | 0 |   |   |   |   |   |   |   |
| 304 |   | 1 |   |   |   |   |   |   |
| 306 |   |   | 0 |   |   |   |   |   |
| 308 |   |   |   | 0 |   |   |   |   |
| 310 |   |   |   |   | 0 |   |   |   |
| 312 |   |   |   |   |   | 0 |   |   |
| 314 |   |   |   |   |   |   | 1 |   |
| 316 |   |   |   |   |   |   |   | 0 |

| | 322 | 324 | 326 | 328 | 330 | 332 | 334 | 336 |
|---|---|---|---|---|---|---|---|---|
| 302 → | 0 | 1 | 1 | 0 | 0 | 0 | 0 | 1 |
| 304 → | 0 | 1 | 0 | 0 | 0 | 1 | 1 | 1 |
| 306 → | 0 | 1 | 1 | 0 | 1 | 1 | 1 | 1 |
| 308 → | 0 | 1 | 0 | 0 | 1 | 1 | 1 | 1 |
| 310 → | 0 | 1 | 1 | 0 | 0 | 1 | 0 | 0 |
| 312 → | 0 | 1 | 1 | 0 | 0 | 1 | 1 | 0 |
| 314 → | 0 | 1 | 1 | 0 | 1 | 0 | 0 | 1 |
| 316 → | 0 | 1 | 1 | 0 | 1 | 1 | 1 | 0 |

FIG. 3D

| | 322 | 324 | 326 | 328 | 330 | 332 | 334 | 336 |
|---|---|---|---|---|---|---|---|---|
| 302 → | 0 | | | | | | | |
| 304 → | | 1 | | | | | | |
| 306 → | | | 1 | | | | | |
| 308 → | | | | 0 | | | | |
| 310 → | | | | | 0 | | | |
| 312 → | | | | | | 1 | | |
| 314 → | | | | | | | 0 | |
| 316 → | | | | | | | | 0 |

TIME-SHIFTED SEED FOR RANDOM NUMBER GENERATOR

BACKGROUND

The present disclosure relates to random number generators, and more specifically, to pseudorandom number generators.

Pseudo-random number generators (sometimes referred to herein as "PRNGs") typically take the form of an algorithm (e.g., an algorithm in software or in circuitry) that can provide numbers that appear to be randomly generated. For example, some PRNGs input a seed value (e.g., a starting value) into one or more algorithms that are numerous enough, complex enough, or both numerous enough and complex enough for numbers created as a result to seem to be generated as part of a truly random process. However, because typical pseudorandom number generators rely on algorithms, the outputs of typical pseudorandom number generators are not truly random unless they are affected by a separate truly random process (such as a seed for a PRNG being produced by a truly random number generator).

SUMMARY

Some embodiments of the present disclosure can also be illustrated as a method for operating a pseudorandom-number-generation system. The method may comprise obtaining, from a pseudorandom number generator, a first pseudorandom number. The method may also comprise creating, using the pseudorandom number, a first register input and inserting the first register input into a shift register. The shift register may comprise a second register input. The method may also comprise selecting a first digit of the first register input from the shift register and selecting a second digit of the second register input from the shift register. The method may also comprise creating a seed using the first and second digits and inputting the seed into the pseudorandom number generator. The method may comprise obtaining, from the pseudorandom number generator, a newly generated pseudorandom number.

Some embodiments of the present disclosure can also be illustrated as a computer program product configured to perform the above summarized method.

Some embodiments of the present disclosure can also be illustrated as a pseudorandom-number-generation system. The system may comprise a pseudorandom number generator, an input of which is a seed and an output of which is used to form a register input. The system may also comprise a shift register, the input of which is the register input. The shift register may comprise a first set of logic gates. Each logic gate in the first set of logic gates comprises a digit of a first pseudorandom number in a set of pseudorandom numbers. The shift register may also comprise a second set of logic gates. Each logic gate in the second set of logic gates comprises a digit of a second pseudorandom number in a set of pseudorandom numbers. The system may also comprise a processor that is configured to create a seed based on contents of the first set of logic gates and the second set of logic gates.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to random number generators; more particular aspects relate to pseudorandom number generators. While the present disclosure is not necessarily limited to such applications, various aspects of the disclosure may be appreciated through a discussion of various examples using this context.

The use of random and pseudorandom numbers is often beneficial in fields such as cryptography (e.g., generation of encryption keys), personal security (e.g., password generation), simulations (e.g., mathematical simulations, simulations of natural processes), and software involving randomized procedural generation (e.g., electronic games). In many applications, utilizing truly random numbers may be more beneficial than pseudorandom numbers. For example, truly random numbers may better simulate natural processes or be more difficult to anticipate in cryptographic settings. Random number generators that are capable of generating truly random numbers may be based off physical processes (e.g., products occurring in nature or quantum processes occurring at very small scales in electronics) that are either slow to occur, expensive to detect, or require very low-level permissions in an associated computer. For these reasons, these truly random number generators are not feasible in many use cases in which the use of random numbers is beneficial.

Unlike truly random number generators, typical pseudorandom number generators are typically based on defined algorithms and their outputs are not truly random. However, because truly random numbers may be more beneficial than pseudorandom numbers in many use cases, pseudorandom number generators are often designed to resemble truly random processes as much as is feasible. Some pseudorandom number generators accomplish this by using a seed as an input to a PRNG algorithm. Such a seed typically takes the form of a number or phrase that is input into an algorithm. Some PRNG algorithms may have a large number of possible outputs for each possible input seed, and therefore PRNGs that utilize varied seeds may have a large number of potential outputs.

In some use cases, seeds themselves may be developed by truly random processes, which may increase the unpredictability of the resulting output of the PRNG algorithms into which they are input. However, generation of these seeds often is subject to the same disadvantages to which truly random number generation is subject (e.g., requiring low-level security permissions that may compromise system security). For this reason, using truly random seeds are oftentimes not feasible. However, while seeds developed by non-truly random processes do increase the potential outputs of pseudorandom number generators, they are also subject to the same disadvantages as numbers generated by pseudorandom processes. In most use cases, these disadvantages result in a pattern of the numbers generated by the PRNG utilizing the seeds. This results in the theoretical predictability of the numbers generated by algorithms utilizing those seeds. In other words, with sufficient time and resources, the patterns behind the generation of the pseudorandom numbers, based on the input seeds, may be discovered, and the output random numbers may then be predicted or calculated after the fact. In use cases in which pseudorandom numbers are relied upon for security purposes (e.g., for development of cryptographic keys or password generation), this can be very costly.

For this reason, some pseudorandom-number-generation systems are designed to increase the potential outputs of the system by utilizing complex seed-generation processes or pseudorandom number generators that output very large numbers. While both these options can make pseudorandom numbers more difficult to predict/calculate, they can greatly increase overall system complexity, which also increases the cost to develop the system and the resources (e.g., memory, input wattage) necessary to operate the system. For this reason, a pseudorandom-number-generation system that increases the potential output of a pseudorandom number generator without adding significant complexity is desired.

Some embodiments of the present disclosure provide a pseudorandom-number-generation system that increases the apparent randomness of generated numbers by increasing the number of potential outputs of the system and increasing the time variability of those outputs. Further, some embodiments of the present disclosure accomplish these benefits without significantly increasing complexity or expense of the system.

For example, some embodiments of the present disclosure take the form of a pseudorandom-number-generation system that includes a pseudorandom number generator and a shift register connected in a loop topology. In some embodiments, the pseudorandom number generator may periodically output a pseudorandom number that is then input into a shift register. The shift register may store that pseudorandom number and a series of previous pseudorandom numbers (e.g., the 63 pseudorandom numbers that were generated most recently before the presently output pseudorandom number). When the PRNG outputs a new number, that number may also be input into the shift register, and the least recent number stored in the shift register may then be deleted. In this way, the contents of the shift register may change each time the PRNG outputs a new pseudorandom number.

In some embodiments, the contents of the shift register may be periodically used to develop a seed for input into the pseudorandom number generator. For example, portions of several of the previously generated pseudorandom numbers in the shift register may be combined into a register output that is either used as a seed or used to develop a seed. In some embodiments, one digit from each of the previously generated pseudorandom numbers may be selected for such an output. For example, if the shift register holds 16 pseudorandom numbers that are each 16 digits in length, the register output may take the form of a new 16-digit number, each digit of which is selected from a different pseudorandom number in the shift register.

In some embodiments, the register output may be used as a seed that is input back into the pseudorandom number generator. In other embodiments, the register output may be used to create a seed. This created seed may either be shorter, longer or the same size as the register output. The seed (either the register output or the seed based on the register output) may then be used by the PRNG to develop a new pseudorandom number. This new pseudorandom number may then be input back into the shift register, adding to the creation of new seeds.

In some embodiments, then, the contents of the shift register (a set of recently generated pseudorandom numbers) may be periodically changed by the pseudorandom number generator. Using the contents of such a shift register to periodically develop seeds for the PRNG may cause the seeds to vary in time. In other words, the pseudorandomness of each pseudorandom number stored in the shift register (i.e., of each pseudorandom number in the contents of the shift register) may contribute to the pseudorandomness of the seed created from the contents of the shift register. Further, each time the PRNG generates a new number, the contents of the shift register may change, causing the additive randomness to vary in time.

Figure 1:
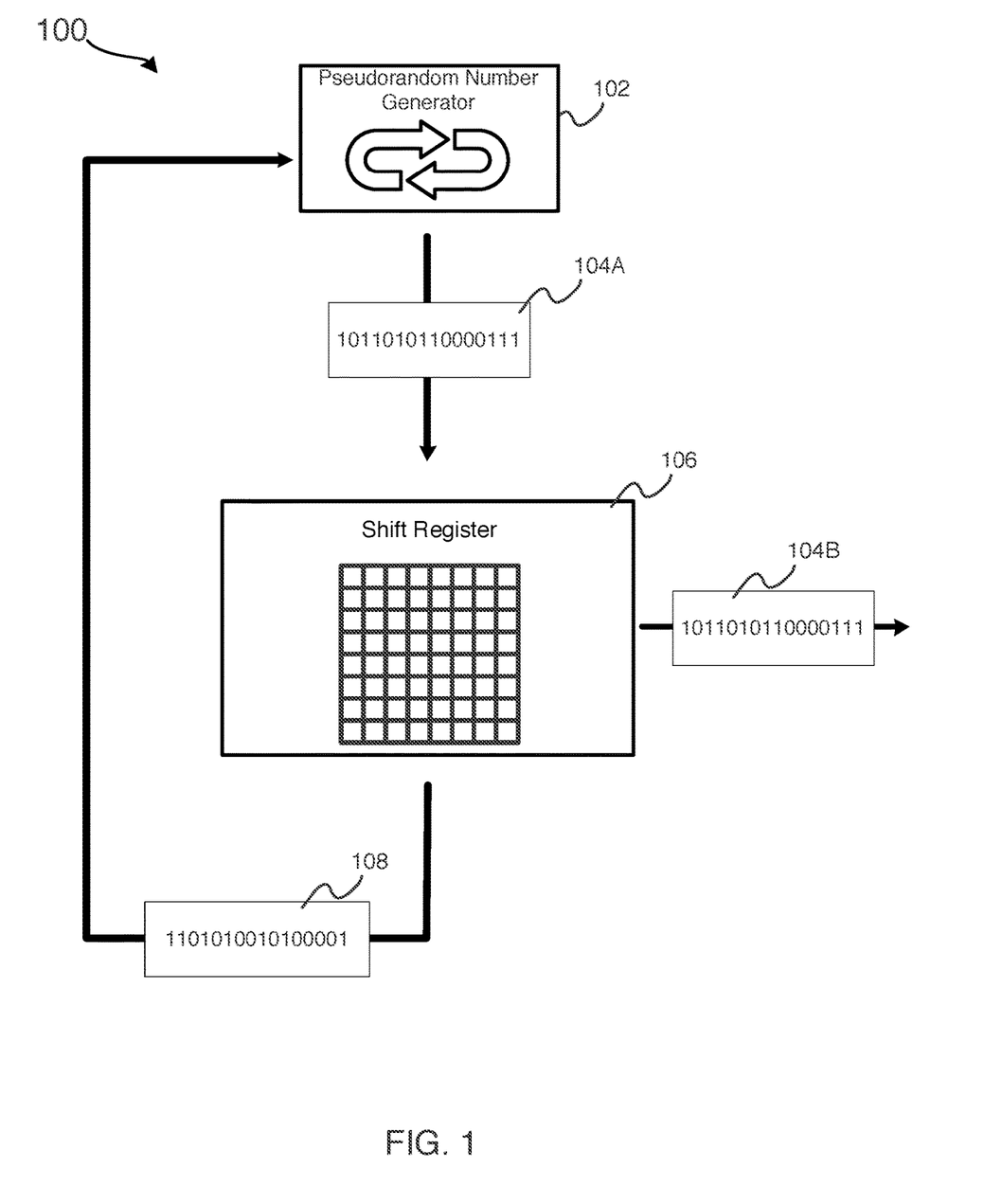
FIG. 1 illustrates an example diagram of a pseudorandom-number-generation system, in accordance with embodiments of the present disclosure.

FIG. 1 illustrates an example diagram of a pseudorandom-number-generation system 100 in accordance with embodiments of the present disclosure. In FIG. 1, pseudorandom-number-generation system 100 is illustrated as an abstracted diagram of a number-generation system. As such, the illustration is presented to aid in comprehension, rather than disclose a precise representation of any particular embodiment.

Pseudorandom-number-generation system 100 includes pseudorandom number generator 102. Pseudorandom number generator 102 (also referred to herein as PRNG 102) may, for example, be composed of several pseudorandom generators that each output a pseudorandom bit. When these outputs are combined together, they may form a vector of several random bits (i.e., a pseudorandom binary number). As illustrated, PRNG 102 outputs pseudorandom number 104A. In FIG. 1, pseudorandom number 104A takes the form of a 16-bit binary number (i.e., a 16-bit vector). Thus, because pseudorandom number 104A is the combined output of PRNG 102, PRNG 102, in FIG. 1, may take the form of 16 pseudorandom generators that each output a single pseudorandom bit.

Pseudorandom number 104A is input into shift register 106. Shift register 106 may take the form of a grid of logic gates (e.g., flip flops) that each store one bit of information. For example, a shift register may take the form of a grid that is 8 bits wide (i.e., that has 8 columns) and 8 bits deep (i.e., that has 8 rows). In such a shift register, the logic gates in a particular dimension may be connected. For example, the output of a first logic gate in a particular column may feed into the input of a second logic gate in the column. Further, the output of the second logic gate in the column may feed into the input of the third logic gate of the column. If each logic gate in the column shares the same clock (i.e., operates on the same frequency and switches at the same time), data added to the first logic gate in the column would cascade through the subsequent logic gates in the column. Further, if the shift register is formed of multiple rows in each column, the data input into the entire first row of logic gates may cascade through the logic gates of the subsequent rows.

For example, shift register 106 may contain a grid of logic gates that is 16 rows wide and 16 columns deep. Pseudorandom number 104A may be input into shift register 106, and each of the 16 bits of pseudorandom number 104A may be stored in a separate logic gate in the first row of shift register 106 (i.e., each bit would be in a separate column in the first row). In other words, the first row of the contents of shift register 106 would be composed of pseudorandom number 104A. Subsequently, if pseudorandom number generator 102 output another pseudorandom number to be input into shift register 106 (for example, at a next cycle of a clock that is used to govern the timing of pseudorandom-number-generating system 100), pseudorandom number 104A may shift to the second row of logic gates in shift register 106, and the "another" pseudorandom number would then occupy the first row. This pattern may continue until pseudorandom number 104A has shifted through all 16 rows of shift register 106, after which point it may be discarded.

The contents of shift register 106 may be utilized to create seed 108. Seed 108 is 16 bits long, and may be the direct output of shift register 106. For example, in each cycle of a clock that is used to govern the timing of pseudorandom-number-generating system 100, shift register 106 may output a 16-digit number that is composed of one bit from each row of the contents of shift register 106. For example, the output of shift register 106 may be selected from the first column of the first row, the second column of the second row, and so on.

In some embodiments, seed 108 may not actually be the output of shift register 106, but the output of shift register 106 may be used to create seed 108. This may be beneficial, for example, if pseudorandom number generator 102 required a seed of a certain length that was either longer or shorter than the output of shift register 106. For example, if the output of shift register 106 were 1101010010100001, the output may be shortened using one or more logic gates. In some embodiments, for example, the output 1101010010100001 could be into pairs of two bits, for example (e.g., 11, 01, 01, 00, 10, 10, 00, and 01), which may then each be input into an XNOR gate. In this way, the pairs of bits could be shortened into one bit each (e.g., 1, 0, 0, 1, 0, 0, 1, and 0). By recombining these bits, an 8-bit seed of 10010010 could be created. Alternatively, seed 108 could be created from the output of shift register 106 by selecting, for example, every third bit of shift register 106. Thus, if the output of shift register 106 were 1101010010100001, the created seed may be 110001 (or simply 11000, if the trailing 1 bit were omitted). Indeed, any method of creating a seed from the output of shift register 106, consistent with the embodiments of this disclosure, is considered.

Once seed 108 is created, it is input as a seed to pseudorandom number generator 102. Pseudorandom number generator 102 may then use the seed to create further pseudorandom numbers, which may then be input into shift register 106.

As illustrated, pseudorandom number 104B may also be obtained from shift register 106. As illustrated, pseudorandom number 104B is the same pseudorandom number as pseudorandom number 104A, but this is merely for the sake of understanding. In practice, pseudorandom number 104B may, in some embodiments, be any pseudorandom number that was previously generated by pseudorandom number generator 102 and currently in the contents of shift register 106. For example, pseudorandom number 104B may be obtained from the contents of any row of shift register 106. In some embodiments, obtaining pseudorandom number 104B from shift register 106 may always obtain the contents of the same row of shift register 106 (e.g., the first row of shift register 106). In other embodiments, obtaining pseudorandom number 104B may select a "random" row of shift register 106. In other embodiments, obtaining pseudorandom number 104B may select a row of shift register 106 according to a pattern (e.g., the eighth row for a first pseudorandom number, the seventh row for a second pseudorandom number, the sixth row for a third pseudorandom number). Once obtained, pseudorandom number 104B may be utilized in an application (e.g., password generation).

In some embodiments, the operations of pseudorandom-number-generation system 100 may occur periodically (e.g., according to a system clock). For example, in some embodiments the following may occur at each cycle of a system clock: pseudorandom number generator 102 may generate a pseudorandom number and input it into shift register 106, the contents of shift register 106 may shift to accommodate the newly generated pseudorandom number (e.g., each number in shift register 106 may shift down a row, and the oldest number may be deleted), the contents of shift register 106 may be used to create a seed, and the created seed may be input into pseudorandom number generator 102. In some embodiments, shift register 106 may also output a pseudorandom number for use in other applications at each clock cycle. In other embodiments, shift register 106 may only output a pseudorandom number when prompted (e.g., by a user).

In some embodiments, the operations of pseudorandom-number-generation system 100 may occur at different clock cycles. For example, some operations of pseudorandom-number-generation system 100 may take longer than others, and some operations may need to wait for other operations to complete. For example, it may take pseudorandom number generator 102 ten clock cycles to generate each pseudorandom number. Thus, pseudorandom number generator 102 may generate a pseudorandom number at clock cycles 10, 20, 30, etc. It may also take two clock cycles to input the newly generated pseudorandom number into shift register 106 and shift the contents of shift register 106 accordingly, thus, those may complete at clock cycles 12, 22, 32, etc. Further, it may take 3 clock cycles to create a seed from the contents of shift register 106 once the contents have shifted. Thus, the contents of shift register 106 may create a seed at clock cycles 15, 25, 35, etc. Finally, it may take 2 clock cycles to input the created seed into pseudorandom number generator 102. Thus, seeds may be input into pseudorandom number generator 102 at clock cycles 17, 27, 37, etc.

Figure 2:
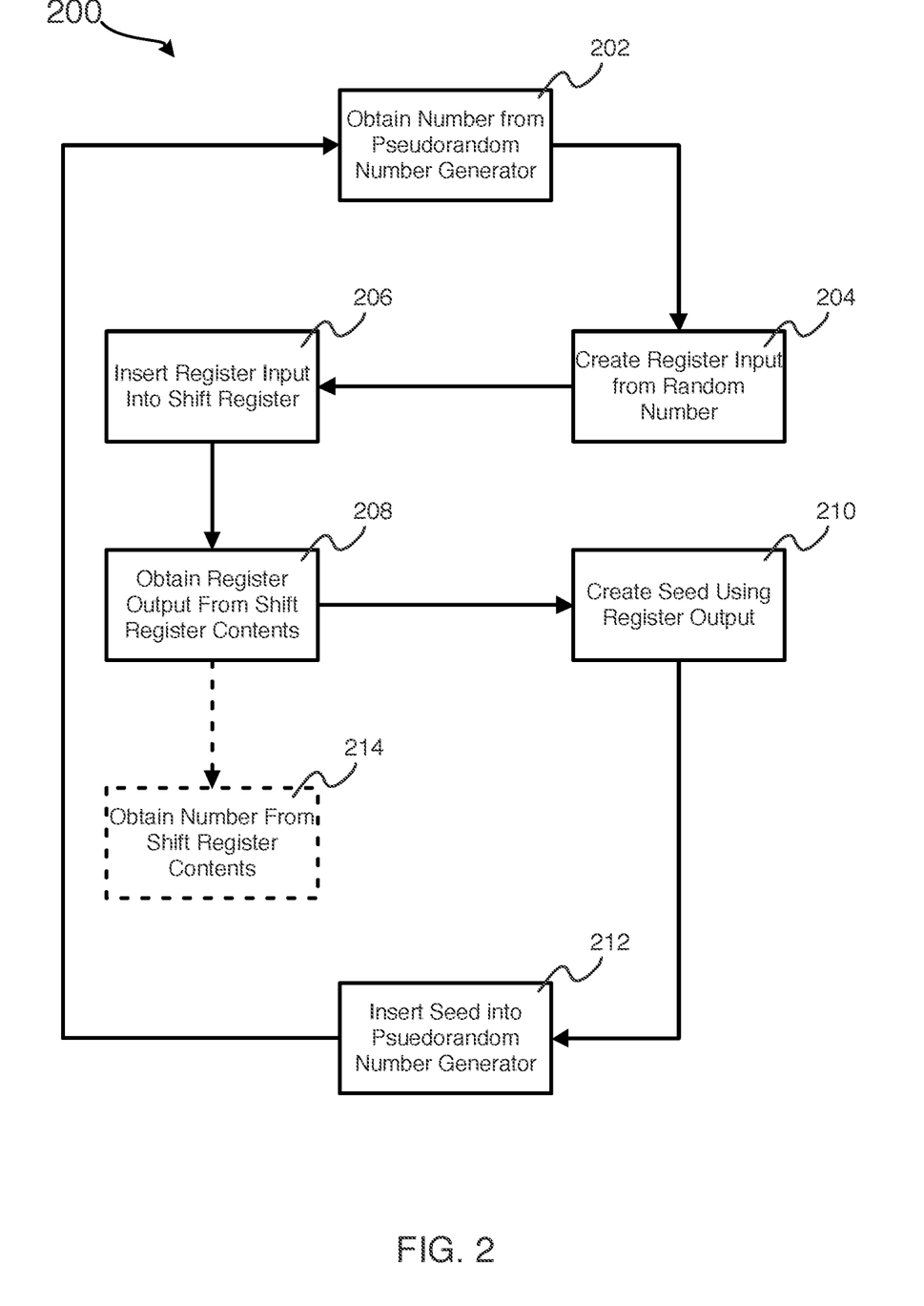
FIG. 2 discloses an example method of operating a pseudorandom-number-generation system, in accordance with the embodiments of this disclosure.

For the purpose of understanding, FIG. 2 discloses an example method 200 of operating a pseudorandom-number-generation system in accordance with the embodiments of this disclosure. Method 200 may be operated, for example, by a generalized computer processor that is controlling the generation of pseudorandom numbers, by the processor of a dedicated controller circuit, or by a dedicated controller circuit without a processor.

In block 202, a pseudorandom number is obtained from a pseudorandom number generator. This pseudorandom number may be, for example, an Arabic-numeral number, a binary number, or other number consistent with the spirit of this disclosure. In block 204, that pseudorandom number is used to create a register input for a shift register. In some embodiments, the pseudorandom number may actually be the register input, in which case block 204 may be a semantic operation (e.g., "creating" a register input from a pseudorandom number may be performed by treating or labeling the pseudorandom number as a register input), or block 204 may not be included in method 200. In some embodiments, however, the pseudorandom number may be modified to form a register input. For example, in some embodiments the generated pseudorandom number may be longer or shorter than the rows of a shift register. If, for example, the generated pseudorandom number is 16 bits long but the rows of a register are only 8 bits long, block 204 may include dividing the generated pseudorandom number into two 8-bit pseudorandom numbers. In some such embodiments, the first 8-bit pseudorandom number may be treated as a register input, while the second 8-bit pseudorandom number may be discarded. In other embodiments, both the first 8-bit pseudorandom number and second 8-bit pseudorandom number may be treated as register inputs, and may be inserted into a shift register separately.

In block 206, the register input (e.g., the pseudorandom number obtained in block 202) is inserted into a shift register (e.g., into the first row of a shift register). In some embodiments, this may result in the contents of the shift register shifting to accommodate the register input. In block 208, a register output is obtained from the contents of the shift register. For example, in some embodiments the shift register may contain 64 rows and each row may contain a 64-bit pseudorandom number (e.g., the sixty-four 64-bit pseudorandom numbers that were most recently generated by a pseudorandom number generator). In some of these embodiments, obtaining a register output may include selecting one bit from each of the 64-bit pseudorandom numbers (creating a 64-bit register output). In some other embodiments, for example, obtaining the register output may include selecting a bit from a portion (e.g., one half) of the 64-bit pseudorandom numbers.

In block 210, a seed is created using the register output that was obtained in block 208 For example, in some embodiments the seed may be created by shortening or lengthening the register output. For example, the seed could be created by inputting the register output into a series of logic gates (e.g., AND, OR, XOR, XNOR gates), reducing the register output to a desired seed length. However, in other embodiments, the seed may actually equal the register output, in which case no transformation of the register output may be required. In these embodiments, block 210 may be a semantic operation or may not be included in method 200.

In block 212, the seed created in block 210 (or obtained in block 208) is input into the pseudorandom number generator from which the pseudorandom number was generated in block 202. The pseudorandom number generator may then use that seed to create a new pseudorandom number, at which point method 200 may loop back to block 202.

As illustrated, method 200 includes optional block 214 in which a pseudorandom number is obtained from the contents of the shift register. In some embodiments, this pseudorandom number may be a number obtained from the pseudorandom number generator in block 202 in the current or a previous iteration of method 200. For example, block 214 may copy the contents of one of the rows of the shift register. In some embodiments, block 214 may occur periodically with each iteration of method 200. In other embodiments, block 214 may only occur when prompted by a user. Finally, while, as illustrated, block 214 involves obtaining a pseudorandom number from the contents of the shift register, in other embodiments the pseudorandom number may be obtained from the pseudorandom number generator. For example, in some embodiments the pseudorandom number generator may, in block 202, output two copies of the pseudorandom number. The first copy may be used to create a register input (or may be used as a register input) and the second copy may be used in an application of a pseudorandom number (e.g., in a simulation of a natural process).

Figure 3A:
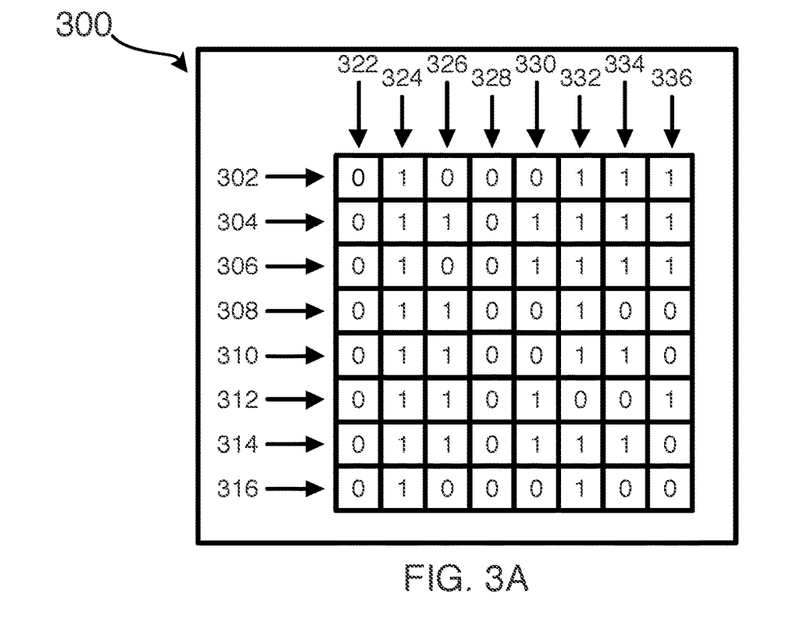
FIG. 3A illustrates an abstracted representation of a register output being created from the contents of a shift register at a first point in time, in accordance with the embodiments of this disclosure.
Figure 3B:
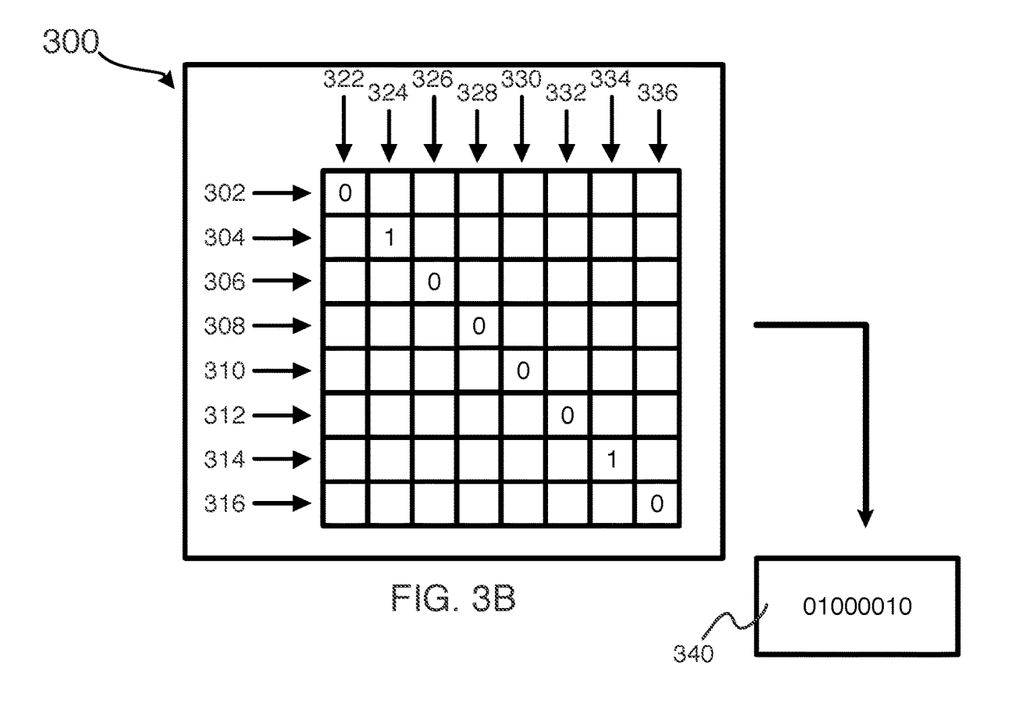
FIG. 3B illustrates an alternate view of an abstracted representation of a register output being created from the contents of a shift register at a first point in time, in accordance with the embodiments of this disclosure.

FIGS. 3A-3B illustrate an abstracted representation of a register output being created from the contents of a shift register, in accordance with the embodiments of the present disclosure. FIG. 3A presents the contents of the logic gates in shift register 300 at a first point in time, after a pseudorandom number has been added to shift register 300. As illustrated, this added pseudorandom number may be the pseudorandom number "01000111." Shift register 300 contains eight rows 302-316 of logic gates and eight columns 322-336 of logic gates, totaling 64 logic gates. The bits in those 64 logic gates compose the contents of shift register 300, as referred to herein. Each of rows 302-316 and columns 322-336 contain 8 logic gates, each of which contains one bit. In some embodiments, those 8 bits may represent pseudorandom numbers input to register 300 by a pseudorandom-number-generation system. For example, the pseudorandom number in row 302, 01000111, may be the most recent pseudorandom number inserted into shift register 300. The pseudorandom number in row 304, 01101111, on the other hand, may be the second-most-recent pseudorandom number inserted into shift register 300. Further, the pseudorandom number 01101111 may have occupied row 302 prior to the point in time illustrated in FIG. 3A, but may have shifted to row 304 when the pseudorandom number 01000111 was input into shift register 300.

As mentioned previously, each of columns 322-336 also contain 8 bits. Column 322, for example, may contain the first bit of each of the eight most-recent pseudorandom numbers input into shift register 300. Row 334, on the other hand, may contain the penultimate bit of each of the eight most-recent pseudorandom numbers input into shift register 300.

FIG. 3B illustrates the creation of seed 340 from the contents of shift register 300 at the first point in time. Seed 340 may be created using one bit from each of the pseudorandom numbers in the contents of shift register 300 (i.e., one bit from each of rows 302-316). As illustrated, seed 340 is also created using only one bit from each of columns 322-336. Thus, the first bit of seed 340 is selected from the contents of the logic gate at row 302 and column 322. The penultimate bit of seed 340 is selected from the contents of the logic gate at row 314 and column 334. As illustrated, then, the bits selected from the contents of shift register 300 form a diagonal pattern across shift register 300. However, in other embodiments not illustrated here, the bits selected may form other patterns (or not pattern at all). In some embodiments, for example, multiple bits may be selected from a single column or row, or zero bits may be selected from a single column or row.

Figure 3C:
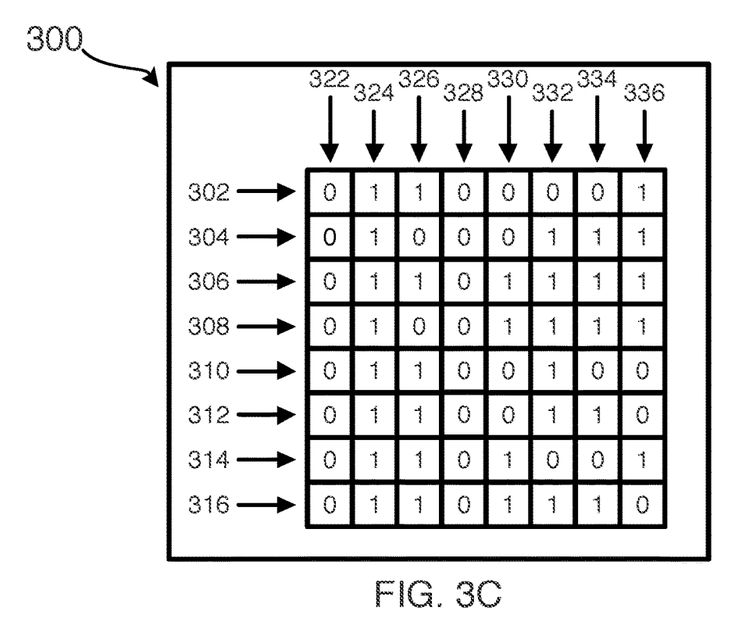
FIG. 3C illustrates an abstracted representation of a register output being created from the contents of a shift register at a second point in time, in accordance with the embodiments of this disclosure.
Figure 3D:
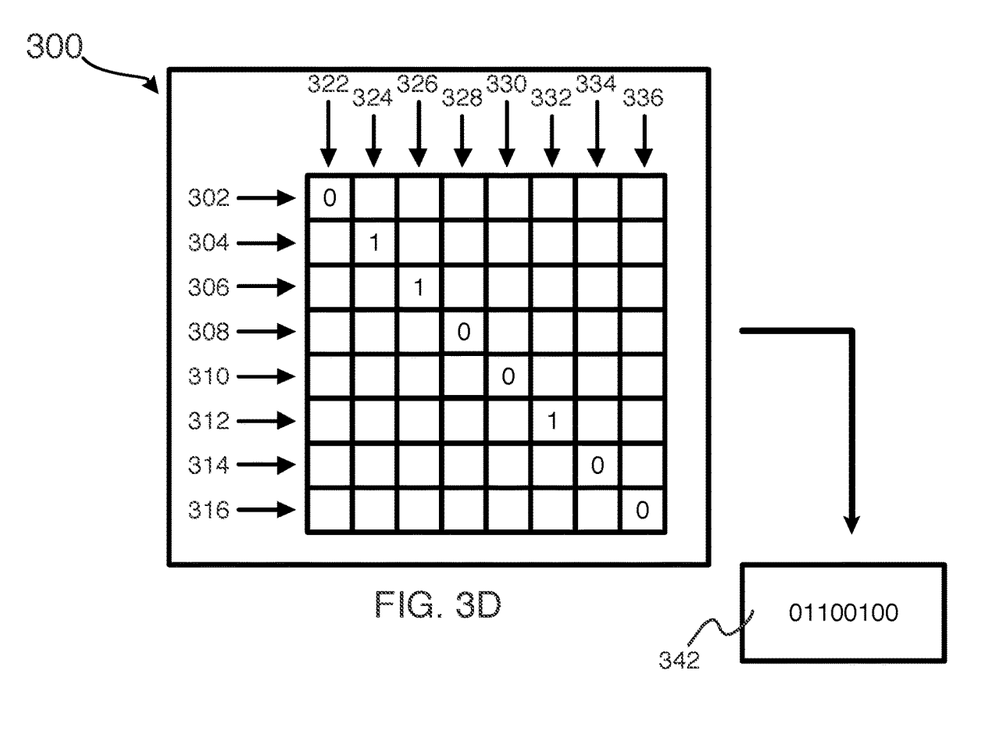
FIG. 3D illustrates an alternate view of an abstracted representation of a register output being created from the contents of a shift register at a second point in time, in accordance with the embodiments of this disclosure.

FIGS. 3C-3D illustrate an abstracted representation of a second register output being created from the contents of shift register 300 at a second point in time. As shown in FIG. 3C, a new pseudorandom number, 01100001, has been input into row 302 of shift register 300. This has caused pseudorandom number 010000111, which was previously in row 302, to shift to row 304. This shift cascaded through shift register 300, causing pseudorandom number 01101110 to shift from row 314 to 316. The pseudorandom number that was previously in row 316, 01000100, may have been discarded or output as a pseudorandom number for use in an external process (e.g., creation of a cryptographic key).

FIG. 3D illustrates the creation of seed 342 from the contents of shift register 300 at the second point in time. Similar to seed 340, the first bit of seed 342 is selected from the logic gate at row 302 and column 322, and the second bit of seed 342 is selected from the logic gate at row 304 and column 324. While the bits selected for seed 342 form the same diagonal pattern as the bits selected for seed 340, the shifting pattern of the contents of shift register 300 have caused seed 342, 01100100, to differ from seed 340, 01000010. In other embodiments, however, the bits selected for seed 342 may form a different pattern than the bits selected for seed 340. For example, the bits in column 336, 11110010, may be used as a seed at the second point in time (i.e., in FIGS. 3C and 3D) in some embodiments.

The shift registers in FIGS. 3A through 3D are illustrated with the same number of logic gates in each row as they have in each column. Such shift registers may be referred to herein as square shift registers. Further, FIGS. 3B and 3D illustrate selection of a seed that contains the same number of bits as each of rows 302-316, making the selection pattern illustrated by FIGS. 3B and 3D possible.

However, some embodiments of the present disclosure utilize shift registers that are not square shift registers (i.e., that have more rows than columns or more columns than rows). Further some embodiments of the present disclosure may create shift-register outputs that have more bits than the shift registers have rows, columns, or both. In these situations, the pattern of logic gates from which bits for the register output are selected may be different than some previously discussed embodiments (e.g., the embodiments illustrated by FIGS. 3A-3D).

Figure 4A:
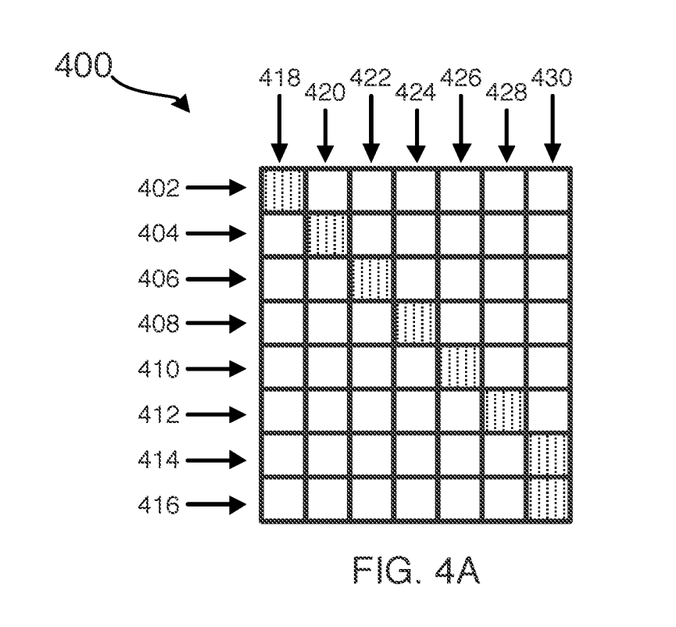
FIG. 4A illustrates an abstraction of a shift register with fewer columns than the number of bits in a selected register output, in accordance with the embodiments of this disclosure.
Figure 4B:
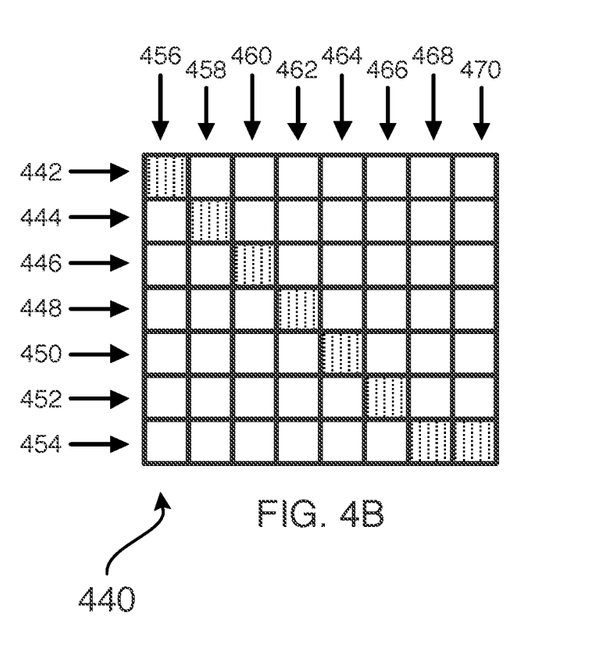
FIG. 4B illustrates an abstraction of a shift register with fewer rows than the number of bits in a selected register output, in accordance with the embodiments of this disclosure.
Figure 4C:
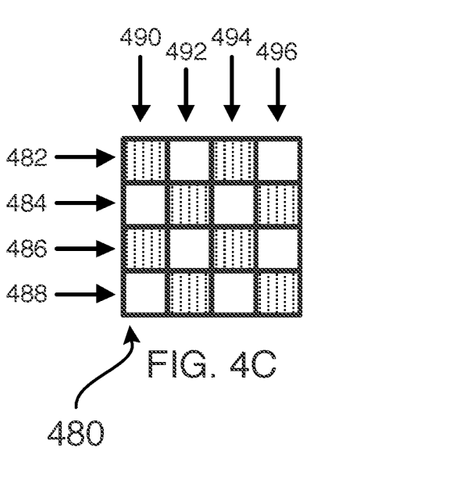
FIG. 4C illustrates an abstraction of a shift register with fewer columns and rows than the number of bits in a selected register output, in accordance with the embodiments of this disclosure.

FIGS. 4A-4C illustrate embodiments of abstractions of shift registers with fewer rows, columns, or both than the number of bits in a selected register output. For example, FIG. 4A discloses a shift register 400 with eight rows 402-416 but with seven columns 418-430. In some embodiments, the contents of shift register 400 may contain, for example, 8 rows of 7-bit pseudorandom numbers, or 7 columns of 8-bit pseudorandom numbers. The pattern of shading in the contents of shift register 400 depicts the selection of logic gates for providing a register output (the shaded cells represent the selected logic gates).

If, for example, the contents of shift register 400 comprised eight rows of 7-bit pseudorandom numbers, only one bit would be selected from each number. However, two bits would be selected from column 430, causing two pseudorandom numbers (i.e., the pseudorandom numbers in rows 414 and 416) to contribute their last bit to the register output. As a result, each pseudorandom number would, throughout the entire process of being shifted through the entire contents of shift register 400 (e.g., shifting through all of rows 402 through 416, contributing a bit to a register output in each row), contribute slightly less information to the overall system. This is because each random number would contribute to eight register outputs while cycling through shift register 400, but would only have seven bits to contribute. Thus, each pseudorandom number would contribute one bit twice. This may affect the variability of the overall pseudo-random-number-generation system over time.

FIG. 4B, on the other hand, discloses a shift register 440 with seven rows 442 through 454 and eight columns 456 though 470. In some embodiments, the contents of shift register 440 may contain, for example, 7 rows of 8-bit pseudorandom numbers, or 8 columns of 7-bit pseudorandom numbers. As with shift register 400, the shading in shift register 440 depicts the selection of logic gates for providing a register output.

If, for example, the contents of shift register 440 comprised seven rows of 8-bit pseudorandom numbers, only one bit would be selected from each column 456-470 for a register output. However, two bits would be selected from the pseudorandom number in row 454. As a result, the total variability over time of a pseudorandom-number-generation system into which register 440 is incorporated may be affected, because requiring one or more pseudorandom numbers to contribute more than one bit for any one register output has similar results to using fewer pseudorandom numbers to form the register output.

FIG. 4C discloses a shift register 480 with four rows 482-488 and four columns 490-496. The contents of shift register 480 may contain, for example, four rows of 4-bit pseudorandom numbers or four columns of 4-bit pseudorandom numbers. In some embodiments, the contents of shift register 480 may contain two 8-bit pseudorandom numbers that are each distributed to two rows (e.g., one pseudorandom number may be stored in rows 482 and 484, the second pseudorandom number may be stored in rows 486 through 488). As with shift registers 400 and 440, the shading in shift register 480 depicts the selection of logic gates for providing a register output.

As illustrated, therefore, an 8-bit register output is being selected from the contents of shift register 480. Because none of rows 482 through 488 or columns 490 through 496 contain 8 bits, multiple logic gates (i.e., bits) will need to be selected from at least one row and at least one column. In the selection pattern shown in FIG. 4C, two bits are being selected from each row and each column.

If, for example, the contents of shift register 480 comprised 4 rows of 4-bit pseudorandom numbers, each pseudorandom number would contribute two bits to each register output. Further, because each column is contributing two bits to each register output, each pseudorandom number would provide each bit twice (i.e., to two different register outputs) while being shifted through shift register 480. As a result, not only would the variability that each pseudorandom number is contributing to any single given register output decrease, but the variability that each pseudorandom number is contributing to the entire overall pseudorandom-number-generation system over time would also decrease.

FIG. 4C illustrates a situation in which a register output with more bits than any given shift-register row is selected. This may be beneficial, for example, when a seed of a length that is greater than the dimensions of the shift register is required. However, in some embodiments, a pseudorandom number generator may require a seed that is shorter than both the pseudorandom numbers in the shift register and the rows/columns of logic gates that store those pseudorandom numbers. In some embodiments, a shorter seed may be selected by selecting fewer bits from the contents of a shift register (e.g., selecting a bit from every other pseudorandom number in the register). However, that may decrease the total amount of data that each pseudorandom number provides to the overall pseudorandom-number-generation system over time, and which may defeat the benefit of using longer pseudorandom numbers.

Thus, in some embodiments, the output of a shift register may be shortened to a desired length when creating a seed for a pseudorandom number generator. For example, some pseudorandom-number-generation systems may create a seed by inputting a register output into a logic gate that outputs a fewer number of bits than are input into the logic gate. For example, when two bits are input into an AND, OR, NAND, NOR, XOR, and XNOR gate, a single bit is output based on the content of those input bits. Thus, shortening a register output with certain logic gates (or chains of logic gates) may result in a shortened seed that still reflects some of the variability of the longer register output (and therefore the set of pseudorandom numbers from which the register output was selected).

Figure 5:
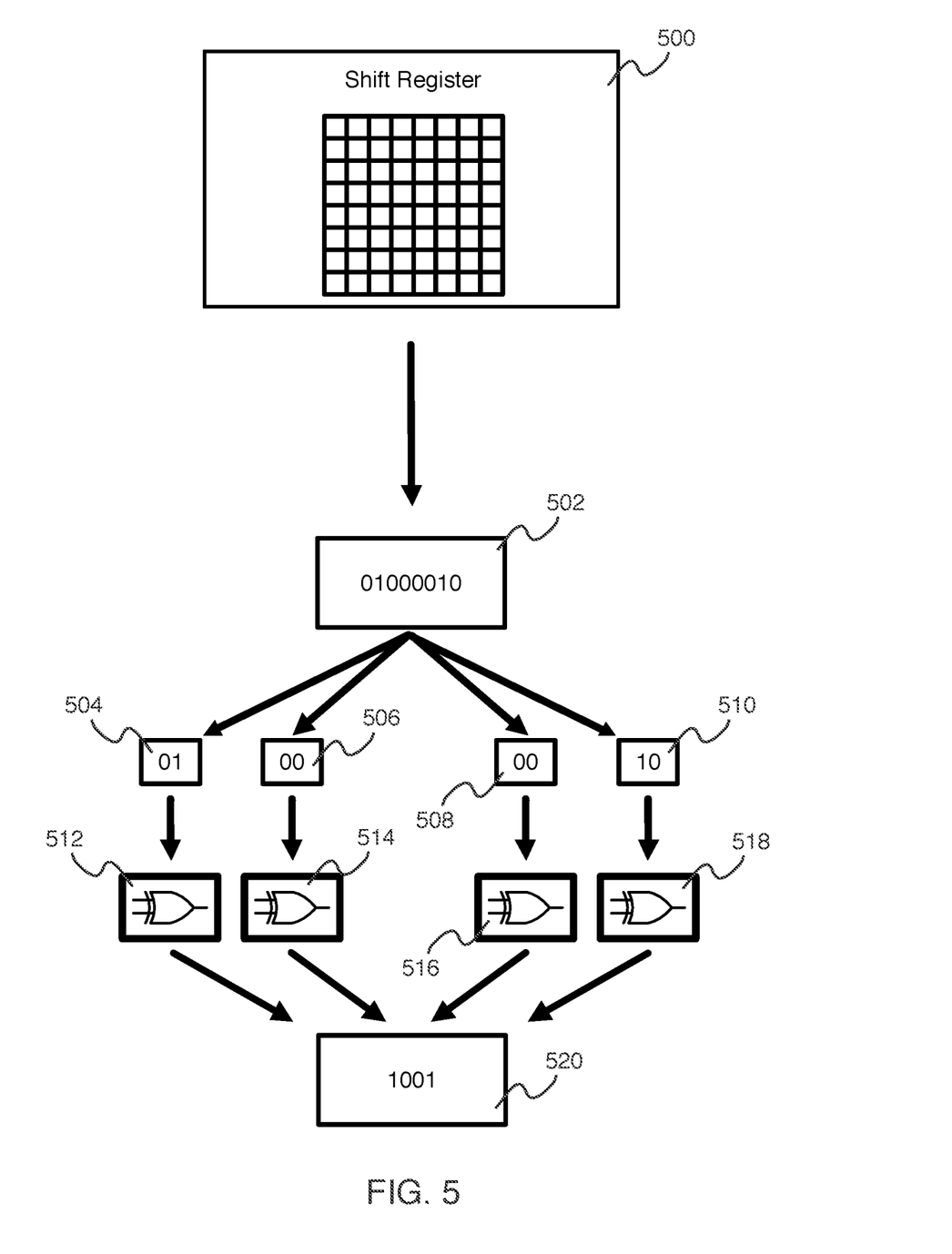
FIG. 5 depicts an example diagram that illustrates an abstracted representation of the process of reducing the length of a register output using logic gates.

FIG. 5 depicts an example diagram that illustrates an abstracted representation of the process of reducing the length of a register output using logic gates. In FIG. 5, register output 502 is selected from shift register 500. Register output 502 is then separated into pairs of bits 504-510. As illustrated, the bits selected for each pair of bits 504 through 510 follows the order of the bits in register output 502. For example, the two bits of pair of bits 504 (0 and 1) are the first two bits of register output 502. This is mainly for the sake of understanding; in other embodiments, pairs of bits may be selected differently (e.g., the first bit and the last bit or the first bit and the fourth bit). This may add to the randomness of the seeds created from the register outputs. For example, in some embodiments, the system may select a different pattern by which to pair bits for each register output. For example, if there are 100 different patterns by which bits could be combined into pairs for a particular embodiment, the system may select the first pattern for a first register output, the second pattern for a second register output, and so on. In other embodiments, the system may select the pattern randomly or pseudorandomly.

Each of pairs of bits 504 through 510 are then input into a respective logic gate 512 through 518. As illustrated, logic gates 512 through 518 take the form of XOR gates, but other logic gates may be used. However, some logic gates may maintain the variability of the register output with more precision than others. For example, an XOR gate outputs a "1" in 50% of all possible input combinations and a "0" in 50% of all possible input combinations, whereas an AND gate inputs a "1" in 25% of all possible input combinations and a "0" in 75% of all possible input combinations. Thus, using AND gates to shorten a series of register outputs may cause most bits of the resulting seeds to be "0," masking some of the total variability of the series of register outputs.

Further, while all of logic gates 512 through 518 take the form of the same logic gate, in some embodiments a distribution of logic gates could be used (e.g., logic gates 512 and 514 could take the form of XOR gates, whereas logic gates 516 and 518 could take the form of XNOR logic gates).

Once pairs of bits 504 through 510 are input into logic gates 512 through 518, logic gates 512 through 518 output single bits that can be combined into seed 520. Seed 520 is a four-bit seed because register output 502 was an 8-bit sequence and was input into four logic gates. However, in some embodiments, different numbers of logic gates could reduce register output 502 to greater or lesser amounts. For example, if only logic gates 512 and 514 were used (for example, if pairs of bits 508 and 510 were not processed by a logic gate), a six-bit seed would result. Alternatively, more logic gates could be utilized to further shorten seed 520. For example, the outputs of logic gates 512-518 could be input into a second set of logic gates (e.g., two more XOR gates), which would result in a 2-bit seed. Using multiple sets of logic gates might be beneficial, for example, in embodiments in which the register output is significantly longer than the desired seed length (e.g., if a pseudorandom-number-generation system utilizes 64-bit pseudorandom numbers, 64-bit register outputs, but 8-bit seeds).

In some embodiments, the output of logic gates 512-518 may be used to lengthen register output 502, rather than shorten it. For example, in some embodiments the output of logic gates 512-518 (1001) could be appended to the end of register output 502 (01000010), creating a longer seed (e.g., 010000101001).

Regardless of the degree to which the pseudorandom-number-generation system shortens or lengthens register output 502, seed 520 may be input to a pseudorandom number generator after being created.

Figure 6:
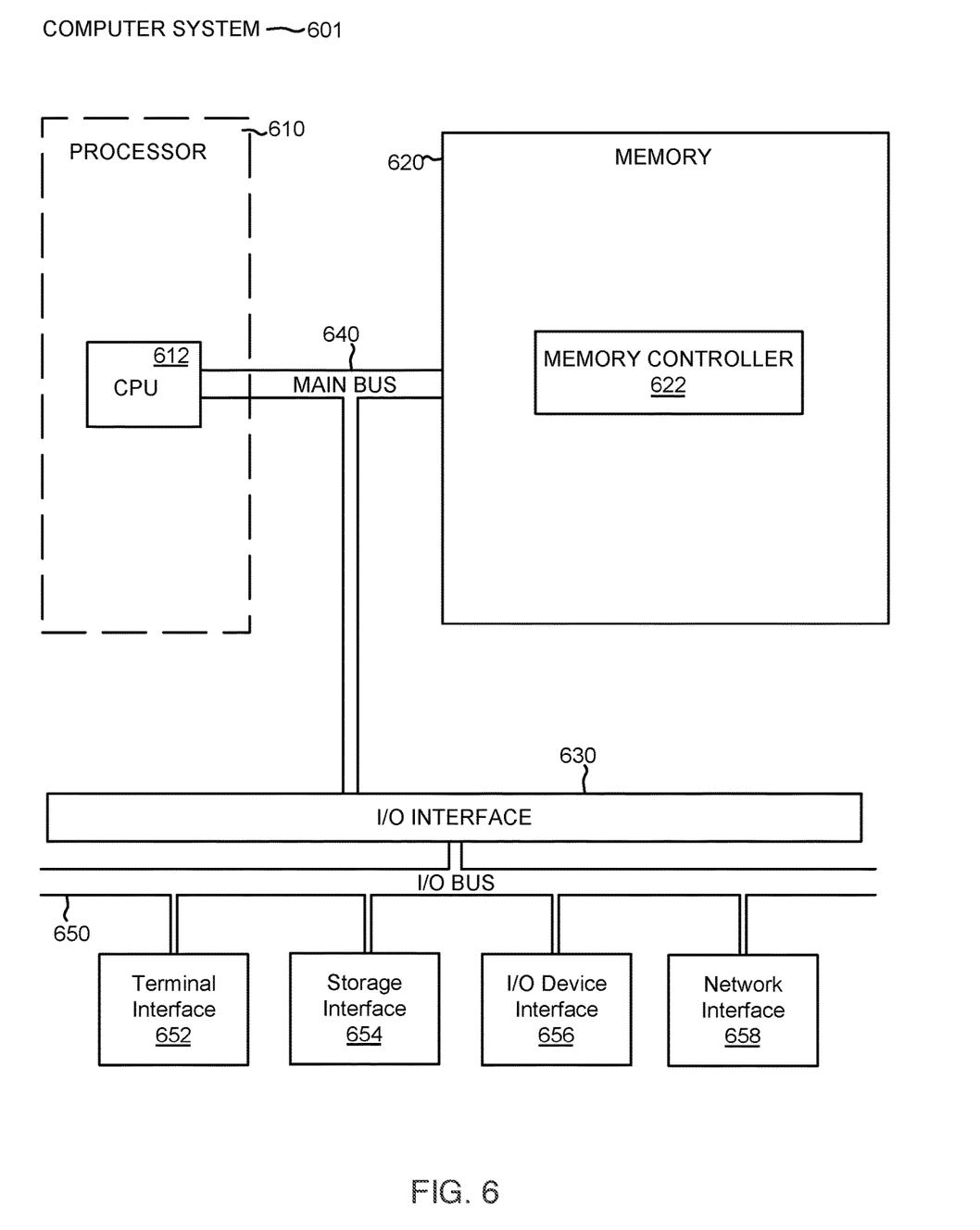
FIG. 6 depicts the representative major components of a computer system that may be used in accordance with embodiments.

FIG. 6 depicts the representative major components of an example Computer System 601 that may be used in accordance with embodiments of the present disclosure. The particular components depicted are presented for the purpose of example only and are not necessarily the only such variations. The Computer System 601 may include a Processor 610, Memory 620, an Input/Output Interface (also referred to herein as I/O or I/O Interface) 630, and a Main Bus 640. The Main Bus 640 may provide communication pathways for the other components of the Computer System 601. In some embodiments, the Main Bus 640 may connect to other components such as a specialized digital signal processor (not depicted).

The Processor 610 of the Computer System 601 may include one or more CPUs 612. The Processor 610 may additionally include one or more memory buffers or caches (not depicted) that provide temporary storage of instructions and data for the CPU 612. The CPU 612 may perform instructions on input provided from the caches or from the Memory 620 and output the result to caches or the Memory 620. The CPU 612 may include one or more circuits configured to perform one or methods consistent with embodiments of the present disclosure. In some embodiments, the Computer System 601 may contain multiple Processors 610 typical of a relatively large system. In other embodiments, however, the Computer System 601 may be a single processor with a singular CPU 612.

The Memory 620 of the Computer System 601 may include a Memory Controller 622 and one or more memory modules for temporarily or permanently storing data (not depicted). In some embodiments, the Memory 620 may include a random-access semiconductor memory, storage device, or storage medium (either volatile or non-volatile) for storing data and programs. The Memory Controller 622 may communicate with the Processor 610, facilitating storage and retrieval of information in the memory modules. The Memory Controller 622 may communicate with the I/O Interface 630, facilitating storage and retrieval of input or output in the memory modules. In some embodiments, the memory modules may be dual in-line memory modules.

The I/O Interface 630 may include an I/O Bus 650, a Terminal Interface 652, a Storage Interface 654, an I/O Device Interface 656, and a Network Interface 658. The I/O Interface 630 may connect the Main Bus 640 to the I/O Bus 650. The I/O Interface 630 may direct instructions and data from the Processor 610 and Memory 620 to the various interfaces of the I/O Bus 650. The I/O Interface 630 may also direct instructions and data from the various interfaces of the I/O Bus 650 to the Processor 610 and Memory 620. The various interfaces may include the Terminal Interface 652, the Storage Interface 654, the I/O Device Interface 656, and the Network Interface 658. In some embodiments, the various interfaces may include a subset of the aforementioned interfaces (e.g., an embedded computer system in an industrial application may not include the Terminal Interface 652 and the Storage Interface 654).

Logic modules throughout the Computer System 601— including but not limited to the Memory 620, the Processor 610, and the I/O Interface 630—may communicate failures and changes to one or more components to a hypervisor or operating system (not depicted). The hypervisor or the operating system may allocate the various resources available in the Computer System 601 and track the location of data in Memory 620 and of processes assigned to various CPUs 612. In embodiments that combine or rearrange elements, aspects of the logic modules' capabilities may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
obtaining, from a pseudorandom number generator, a first pseudorandom number;
creating, using the pseudorandom number, a first register input;
inserting the first register input into a shift register, wherein the shift register comprises a second register input;
selecting, from the shift register, a first digit of the first register input;
selecting, from the shift register, a second digit of the second register input;
creating a seed using the first digit and second digit;
inputting the seed into the pseudorandom number generator;
obtaining, from the pseudorandom number generator, a newly generated pseudorandom number; and
inputting the newly generated pseudorandom number into the shift register, wherein the inputting the newly generated pseudorandom number into the shift register causes the first register input to shift in the shift register and the second register input to be erased from the shift register.

2. The method of claim 1, wherein creating the seed using the first digit and the second digit comprises inputting the first digit and the second digit into a logic gate.

3. The method of claim 1, wherein the first register input is the first pseudorandom number and the second register input is the newly generated pseudorandom number.

4. The method of claim 1, wherein the shift register contains a set of pseudorandom numbers and wherein the seed is based on the contents of each pseudorandom number in the set of pseudorandom numbers.

5. The method of claim 1, wherein the pseudorandom number comprises a number of bits, and wherein the shift register comprises a number of rows that is equal to the number of bits and a number of columns that is equal to the number of bits.

6. The method of claim 5, wherein the number of bits is 64 bits.

7. A pseudorandom-number-generation system comprising:
a pseudorandom number generator, an input of which is a seed and an output of which is used to form a register input;
a shift register, the input of which is the register input, wherein the shift register comprises:
a first set of logic gates, wherein each logic gate in the first set of logic gates comprises a digit of a second register input a set of register inputs; and
a second set of logic gates, wherein each logic gate in the second set of logic gates comprises a digit of a third register input a set of register inputs; and
a processor configured to create the seed based on contents of the first set of logic gates and the second set of logic gates;
wherein the pseudorandom number generator is configured to output a pseudorandom number that is used to create a fourth register input, and wherein inserting the fourth register input into the shift register causes the third register input to shift out of the second set of logic gates, the second register input to shift into the second set of logic gates, and the fourth register input to shift into the first set of logic gates.

8. The pseudorandom-number-generation system of claim 7, further comprising:
a system clock configured to govern the timing of the pseudorandom-number-generation system.

9. The pseudorandom-number-generation system of claim 7, wherein the processor is configured to select a single digit from each register input in the set of register inputs to form a register output using the selected digits.

10. The system of claim 9, wherein the register output equals the seed.

11. The system of claim 9, wherein the register output is used to create the seed.

12. The system of claim 7, wherein the second register input comprises a number of bits and wherein the shift register comprises a number of rows of logic gates that is equal to the number of bits and a number of columns of logic gates that is equal to the number of bits.

13. A computer program product, the computer program product comprising a computer readable storage medium having program instructions embodied therewith, the program instructions executable by a computer to cause the computer to:
obtain, from a pseudorandom number generator, a first pseudorandom number;
create, using the pseudorandom number, a first register input;
insert the first register input into a shift register, wherein the shift register comprises a second register input;

select, from the shift register, a first digit of the first register input;

select, from the shift register, a second digit of the second register input;

create a seed using the first digit and second digit;

input the seed into the pseudorandom number generator;

obtain, from the pseudorandom number generator, a newly generated pseudorandom number; and input the newly generated pseudorandom number into the shift register, wherein the inputting the newly generated pseudorandom number into the shift register causes the first register input to shift in the shift register and the second register input to be erased from the shift register.

14. The computer program product of claim 13, wherein creating the seed using the first digit and the second digit comprises inputting the first digit and the second digit into a logic gate.

15. The computer program product of claim 13, wherein the first register input is the first pseudorandom number and the second register input is the second pseudorandom number.

16. The computer program product of claim 13, wherein the shift register contains a set of pseudorandom numbers and wherein the seed is based on the contents of each pseudorandom number in the set of pseudorandom numbers.

17. The computer program product of claim 13, wherein the pseudorandom number comprises a number of bits, and wherein the shift register comprises a number of rows that is equal to the number of bits and a number of columns that is equal to the number of bits.

* * * * *